(12) United States Patent
Lepper

(10) Patent No.: US 11,519,442 B2
(45) Date of Patent: Dec. 6, 2022

(54) BLIND ASSEMBLY FASTENER SYSTEM

(71) Applicant: Illinois Tool Works Inc., Glenview, IL (US)

(72) Inventor: Mark O. Lepper, Oak Park, IL (US)

(73) Assignee: Illinois Tool Works Inc., Glenview, IL (US)

( * ) Notice: Subject to any disclaimer, the term of this patent is extended or adjusted under 35 U.S.C. 154(b) by 14 days.

(21) Appl. No.: 17/237,678

(22) Filed: Apr. 22, 2021

(65) Prior Publication Data
US 2021/0348635 A1 Nov. 11, 2021

Related U.S. Application Data

(60) Provisional application No. 63/022,612, filed on May 11, 2020.

(51) Int. Cl.
| | |
|---|---|
| *B60R 13/02* | (2006.01) |
| *F16B 19/10* | (2006.01) |
| *B21J 15/04* | (2006.01) |
| *F16B 5/06* | (2006.01) |
| *F16B 21/08* | (2006.01) |

(52) U.S. Cl.
CPC ........... *F16B 19/1036* (2013.01); *B21J 15/04* (2013.01); *F16B 5/0657* (2013.01); *F16B 21/086* (2013.01)

(58) Field of Classification Search
CPC .................................................. F16B 5/0657
See application file for complete search history.

(56) References Cited

U.S. PATENT DOCUMENTS

| | | | | |
|---|---|---|---|---|
| 5,051,021 A | * | 9/1991 | Pelz | F16B 21/09 248/222.12 |
| 5,195,793 A | * | 3/1993 | Maki | F16B 5/128 24/297 |
| 6,253,423 B1 | * | 7/2001 | Friedrich | F16B 21/086 24/289 |
| 6,715,185 B2 | * | 4/2004 | Angellotti | F16B 5/0657 24/297 |
| 6,796,006 B2 | | 9/2004 | Hansen | |
| 7,114,221 B2 | * | 10/2006 | Gibbons | F16B 21/082 24/336 |
| 7,152,281 B2 | * | 12/2006 | Scroggie | B60R 13/0206 411/509 |
| 7,178,855 B2 | | 2/2007 | Catron et al. | |

(Continued)

FOREIGN PATENT DOCUMENTS

| | | |
|---|---|---|
| EP | 3557086 A1 | 10/2019 |
| WO | 2015175098 A1 | 11/2015 |

(Continued)

*Primary Examiner* — Jason W San

(74) *Attorney, Agent, or Firm* — McAndrews, Held & Malloy, Ltd.

(57) ABSTRACT

Disclosed are systems and methods for coupling a first panel to a second panel via a fastening system. The fastening system comprises fastener and a doghouse structure. The fastener includes a head assembly coupled to a collar. The collar is configured to pass through and to retain the second panel via an opening formed in the second panel. The doghouse structure defines a chamber that is configured to receive and secure the head assembly. The doghouse structure is positioned on the first panel and is configured to pass at least partially through the opening.

20 Claims, 7 Drawing Sheets

(56) References Cited

U.S. PATENT DOCUMENTS

| | | | |
|---|---|---|---|
| 7,401,388 B2 | 7/2008 | Hansen | |
| 7,413,371 B2* | 8/2008 | Arnold | B60R 22/18 403/329 |
| 7,900,953 B2 | 3/2011 | Slobodecki et al. | |
| 7,954,205 B2* | 6/2011 | Xueyong | F16B 5/128 24/297 |
| 8,046,880 B2* | 11/2011 | Katoh | F16B 5/0628 24/297 |
| 8,322,001 B2* | 12/2012 | Ehrhardt | F16B 5/123 24/457 |
| 8,511,631 B2* | 8/2013 | Kato | F16B 21/086 24/297 |
| 8,528,295 B2* | 9/2013 | Glynn | B60R 13/0206 24/295 |
| 8,585,121 B2* | 11/2013 | Marx | B60R 13/0206 24/297 |
| 8,671,528 B2* | 3/2014 | Hayashi | F16B 21/086 24/297 |
| 8,683,662 B2 | 4/2014 | Cooley et al. | |
| 8,875,357 B2* | 11/2014 | Reznar | F16B 5/065 24/453 |
| 8,979,156 B2* | 3/2015 | Mally | F16B 21/09 24/297 |
| 9,079,341 B2* | 7/2015 | Risdale | B29C 45/1635 |
| 9,303,665 B2 | 4/2016 | Steltz et al. | |
| 9,982,694 B2* | 5/2018 | Scroggie | F16B 5/0084 |
| 10,125,804 B2* | 11/2018 | Krippl | F16B 21/09 |
| 10,471,909 B2* | 11/2019 | Abe | B60J 10/36 |
| 2004/0016088 A1* | 1/2004 | Angellotti | F16B 5/065 24/297 |
| 2007/0107174 A1* | 5/2007 | Bordas | F16B 5/0657 24/664 |
| 2008/0052878 A1 | 3/2008 | Lewis et al. | |
| 2009/0188086 A1* | 7/2009 | Okada | F16B 21/086 24/297 |
| 2010/0146747 A1* | 6/2010 | Reznar | F16B 5/0657 24/457 |
| 2012/0073089 A1* | 3/2012 | Buillas | F16B 5/0657 24/293 |
| 2015/0113773 A1* | 4/2015 | Iwahara | F16B 5/0664 24/594.11 |
| 2015/0322985 A1* | 11/2015 | Scroggie | F16B 19/008 24/458 |
| 2015/0337882 A1* | 11/2015 | Iwahara | F16B 2/20 24/489 |
| 2016/0129854 A1* | 5/2016 | Bachelder | F16B 5/0628 24/292 |
| 2016/0290380 A1* | 10/2016 | Fellows | F16B 5/0657 |
| 2016/0368433 A1* | 12/2016 | Vega Velazquez | F16B 13/04 |
| 2017/0051780 A1* | 2/2017 | Dickinson | F16B 21/076 |
| 2017/0129421 A1* | 5/2017 | Dickinson | F16B 21/075 |
| 2017/0268550 A1* | 9/2017 | Michelini | F16B 5/0664 |
| 2018/0128297 A1* | 5/2018 | Meyers | B60R 13/0206 |
| 2020/0232495 A1* | 7/2020 | Lepper | F16B 5/0628 |
| 2021/0221492 A1* | 7/2021 | Vincon | B64C 1/066 |

FOREIGN PATENT DOCUMENTS

| | | |
|---|---|---|
| WO | 2016073231 A1 | 5/2016 |
| WO | 2016144438 A1 | 9/2016 |
| WO | 2017164967 A1 | 9/2017 |
| WO | 2018147984 A1 | 8/2018 |
| WO | 2019040301 A1 | 2/2019 |

* cited by examiner

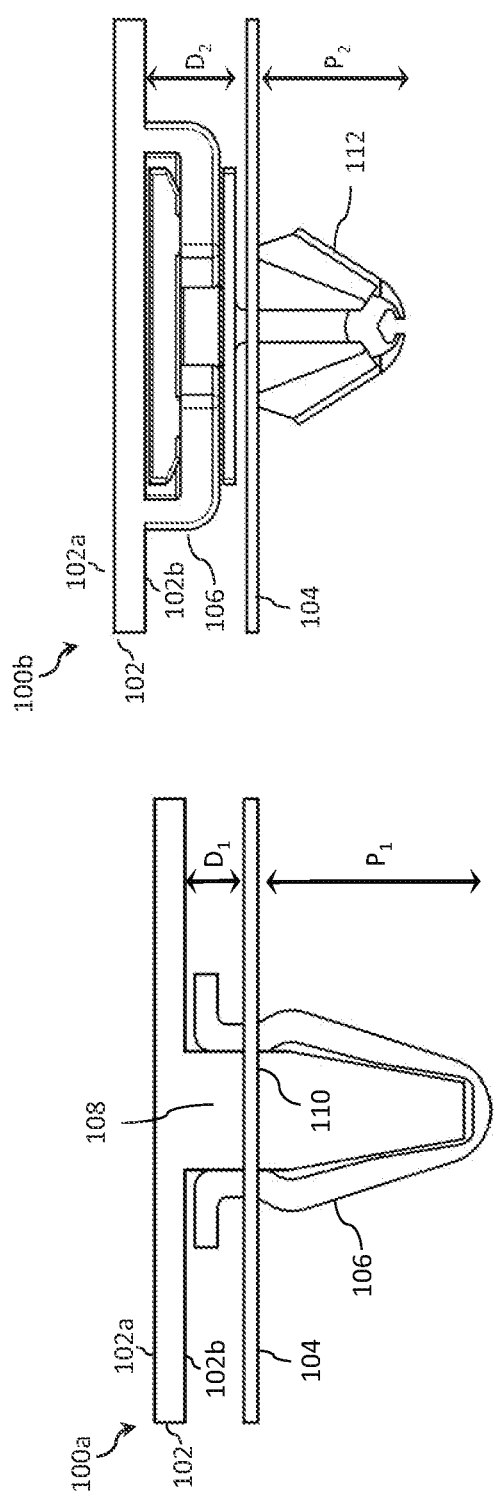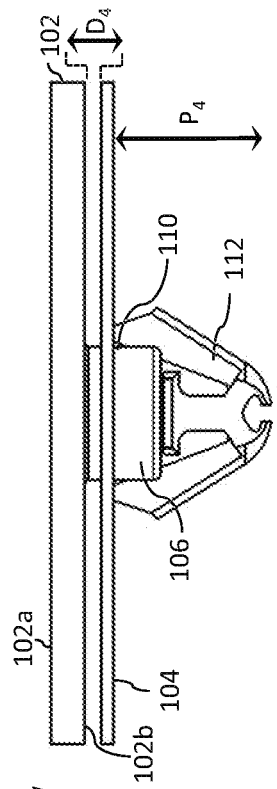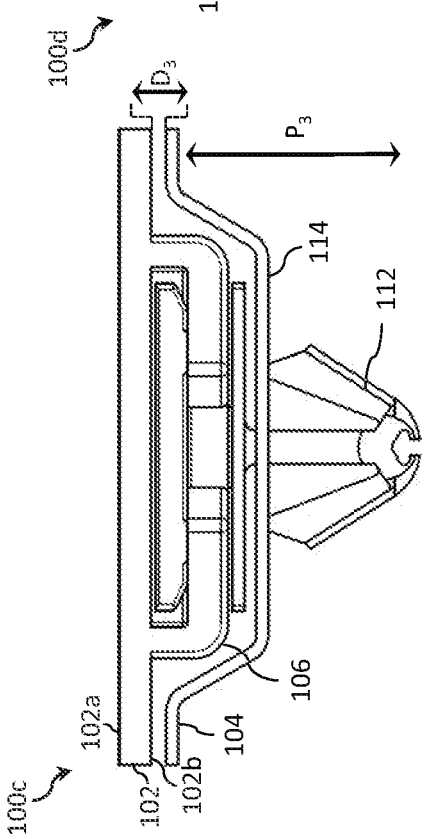
FIG. 1a  FIG. 1b  FIG. 1c  FIG. 1d

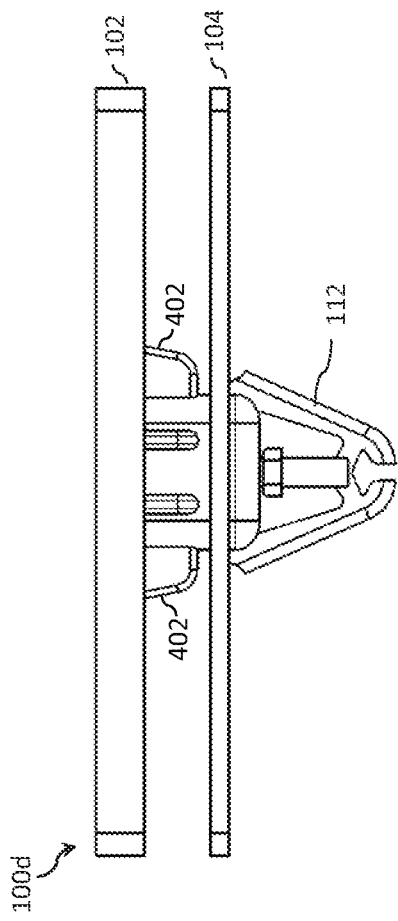
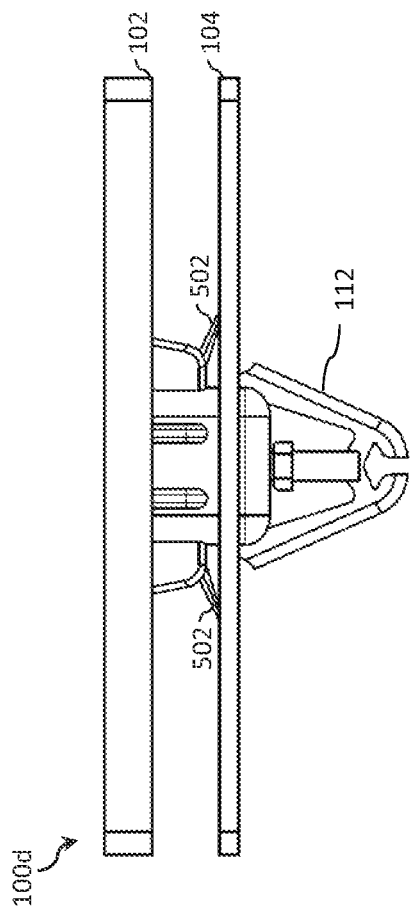
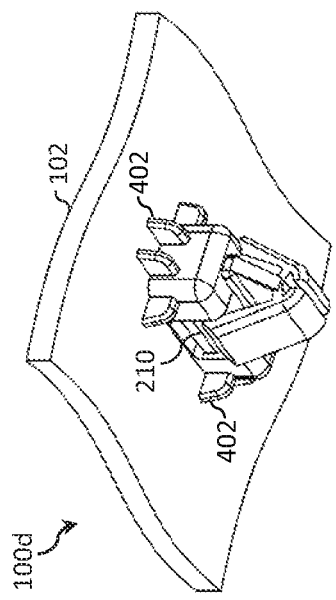
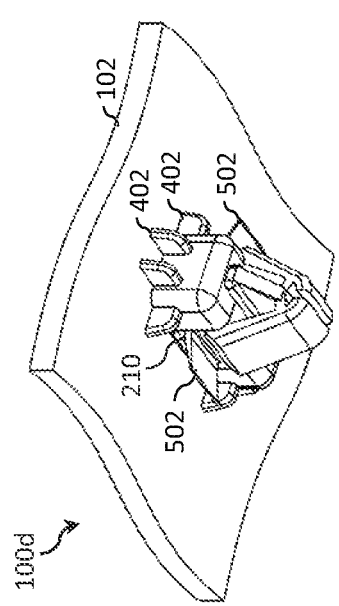

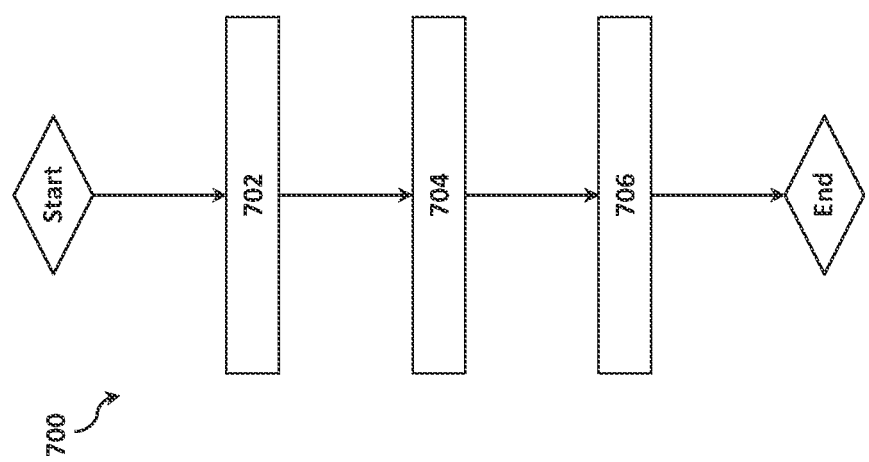

BLIND ASSEMBLY FASTENER SYSTEM

CROSS-REFERENCE

The present application claims the benefit under 35 U.S.C. § 119(e) of U.S. Provisional Patent Application Ser. No. 63/022,612, filed May 11, 2020, and entitled "Blind Assembly, Close-Panel, Doghouse Interface Fastener System," the contents of which are hereby incorporated by reference.

BACKGROUND

Automotive components require fastening techniques that are simple to manufacture and assemble. Further, fastening techniques should above all be reliable and efficient. A blind, close-panel assembly is a condition where the fastening is focused between the panels being fastened to each other (such as automotive panels or other components), while trying to keep those same panels positioned very closely to each other.

Typical fastening solutions that allow this type of closely-positioned assembly include, magnets, adhesive tape, and mechanical fasteners. For example, a metal fastener can be used to make a blind connection between panels. Traditionally, a simple metal fastener can be received within an opening (e.g., a window or aperture) formed in a primary panel and configured to engage a blade structure that extends from an undersurface of a secondary panel. Existing metal fasteners are deficient in that the abrasive nature of the metal fasteners often wears through the paint or anticorrosive coatings of the primary panel (e.g., the sheet metal framework of a vehicle), thereby promoting corrosion. In addition, metal fasteners have a tendency to buzz, squeak, and rattle, a condition typically referred to as "BSR."

In an effort to mitigate BSR and to prevent corrosion, plastic fasteners can be used as a replacement for metal fasteners. Such plastic fasteners, however, can increase the distance between panels and sometimes require moderately high insertion forces. In some examples, fasteners are fabricated using a combination of metal and plastic components to mitigate abrasion and avoid BSR. Such fasteners, however, are typically larger and can be more difficult to manufacture. Further, while fasteners come in many sizes and levels of performance, many fastener types cannot utilize a blade structure for blind part-in-assembly (PIA) strategies.

It would therefore be highly desirable to have a fastener assembly with improved assembly characteristics that provides reliable and secure fastening, while allowing for the panels to be positioned very closely to each other.

SUMMARY

The present disclosure relates generally to a fastening system to form a blind connection between the panels, such as automotive panels, substantially as illustrated by and described in connection with at least one of the figures, as set forth more completely in the claims.

DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

FIGS. 1a through 1d illustrate side views of example fastening systems configured to form a blind connection between panels in accordance with aspects of this disclosure.

FIGS. 2b and 2c illustrate, respectively, partially assembled and assembled perspective views of the pass-through doghouse-based fastening system of FIG. 2a.

FIGS. 4a and 4b illustrate an example pass-through doghouse-based fastening system configured with ribs in accordance with aspects of this disclosure.

FIGS. 5a and 5b illustrate an example pass-through doghouse-based fastening system configured with ribs and wings in accordance with aspects of this disclosure.

FIG. 7 is a flowchart representative of an example a method of coupling a first panel to a second panel using the fastener of FIGS. 2a through 2c.

DESCRIPTION

Figure 2A:
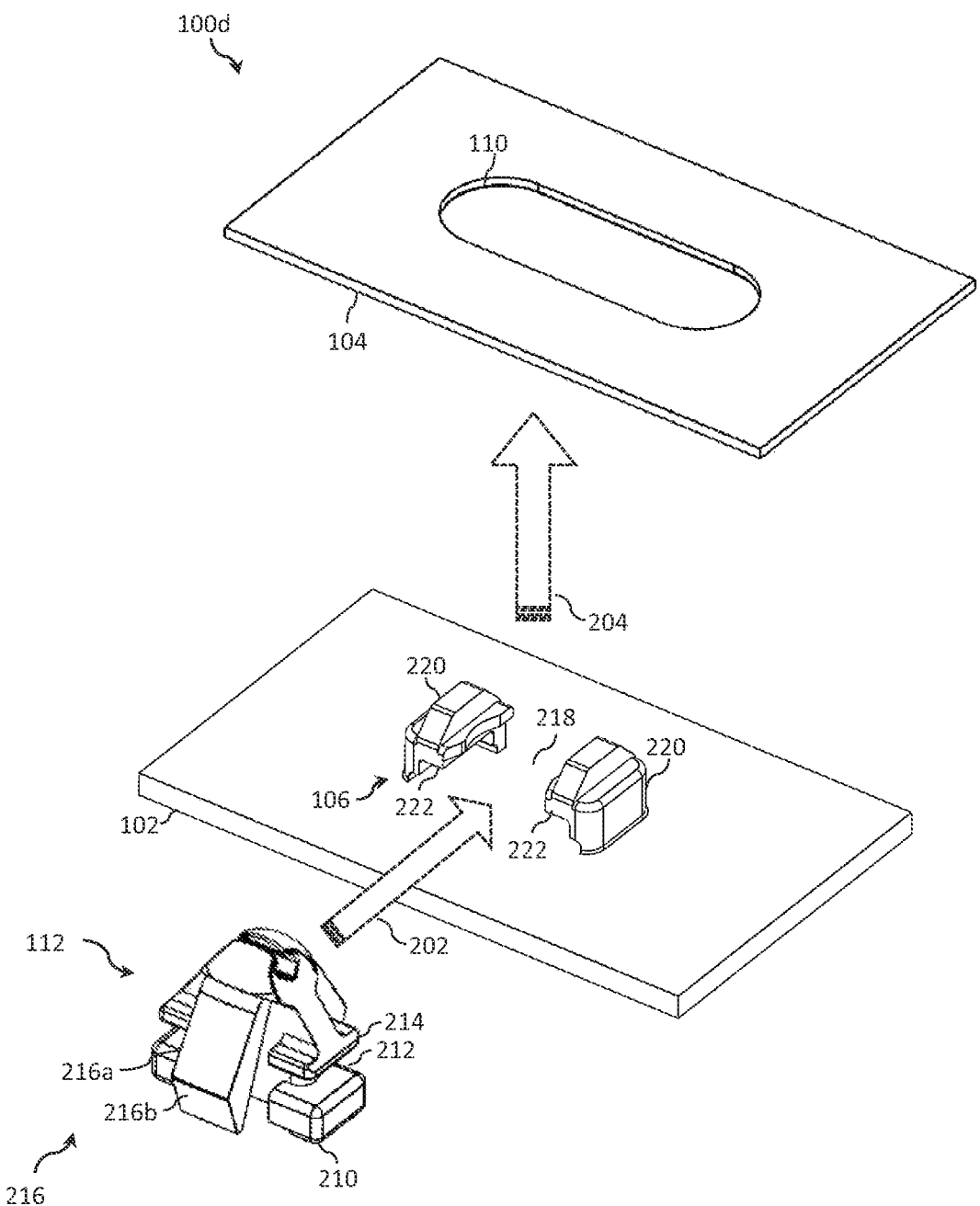
FIG. 2a illustrates a perspective assembly view of the pass-through doghouse-based fastening system of FIG. 1d in accordance with aspects of this disclosure.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

A fastener can be used to form a blind connection between a first panel and a second panel, such as automotive panels. In one example, a fastener forms a blind connection between a first panel and a second panel where the fastener includes a head assembly and a retention feature extending outwardly from the fastener at an end opposite the head assembly. The fastener being configured to attach the first panel adjacent to the second panel, the first panel having a doghouse structure and the second panel having an opening formed therethrough. The opening being positioned about the doghouse structure with the head assembly positioned within the doghouse structure to from the blind connection. In some examples, the doghouse structure defines a chamber that is configured to receive and secure the head assembly. The doghouse structure can be configured to pass at least partially through the opening. The fastener may be a W-type fastener, a push pin fastener, and/or a pin and grommet (P&G) fastener. In some examples, the fastener comprises one or more ribs configured to support the doghouse structure and to control over-travel. The one or more ribs can be positioned at an interface between the doghouse structure and the first panel. In some examples, the fastener comprises a wing coupled to the head assembly and shaped as a spring to absorb movement between the first panel and the second panel. In some examples, the fastener further comprises a seal configured to surround the doghouse structure between the first panel and the second panel. The retention feature may be configured to engage the second panel via a catch. For example, the retention feature includes a return arm resiliently connected to the end opposite the head assembly via a collar and configured to deflect as the collar is passed through the opening. The catch can be configured to engage the second panel at a location adjacent to the doghouse structure.

In another example, a fastening system includes a first panel having a first surface and a second surface; a doghouse structure formed on the second surface, wherein the doghouse structure defines a chamber; a second panel defining an opening; and a fastener having a head assembly and a retention feature extending outwardly from the fastener at an end opposite the head assembly, wherein the chamber is configured to receive the head assembly and the retention feature is configured to pass through and to retain the second panel via the opening, and wherein the doghouse structure is configured to pass at least partially through the opening. The first surface may be an A-surface and the second surface may be a B-surface. In some examples, the fastener comprises a retention feature configured to engage the second panel via a catch. In some examples, the fastener comprises a wing shaped as a spring to absorb movement between the first panel and the second panel.

In yet another example, a method of forming a blind connection between a first panel and a second panel via a doghouse structure and a fastener having a head assembly and a neck comprises: sliding the head assembly across a surface of the first panel into a chamber of the doghouse structure; passing at least a portion of the neck through an opening formed on the second panel; and passing at least a portion of the doghouse structure through the opening. In some examples, the neck is configured to engage the second panel via a retention feature. In some examples, the retention feature includes a return arm resiliently connected to a collar that is coupled to the neck and configured to deflect as the collar is passed through the opening.

FIGS. 1a through 1d illustrate side views of example fastening systems 100a, 100b, 100c, 100d configured to form a blind connection between a first panel 102 and a second panel 104. The first panel 102 and the second panel 104 may be, for example, automotive panels. Depending on the application, the first panel 102 and the second panel 104 may be fabricated from, for example, metal (or a metal alloy), synthetic or semi-synthetic polymers (e.g., plastics, such as acrylonitrile butadiene styrene (ABS) and polyvinyl chloride (PVC), etc.), composite materials (e.g., fiber glass), or a combination thereof. In one example, the first panel 102 is an automotive secondary panel and the second panel 104 is an automotive primary panel. In the automotive industry, example first panels 102 include, without limitation, door trim panels, moldings, trim pieces, and other substrates (whether used as interior or exterior surfaces).

The first panel 102 may define an A-surface 102a and a B-surface 102b (illustrated as an undersurface). The A-surface 102a, also called a class A surface, is typically the surface that is visible after assembly and, for that reason, is more aesthetically pleasing (e.g., textured, coated, or otherwise decorated) and typically free of attachment devices and/or related features. Conversely, the B-surface 102b, also called a class B surface, is typically the surface that is not visible after assembly and typically includes various attachment devices and/or related features.

The first panel 102 may be include, define, or otherwise be associated with attachment devices and/or related features, such as one or more towers 108, doghouse structure 106, etc. Depending on the material type, the attachment devices and/or related features may be formed on the B-surface 102b during molding or layup of the first panel 102, or attached after fabrication (e.g., using adhesive or mechanical fasteners). After assembly, the second panel 104 is covered at least partially by the first panel 102. The second panel 104 may be, for example, a structural component of a vehicle, such as doors, pillars (e.g., an A-pillar, B-pillar, C-pillar, etc.), dashboard components (e.g., a cross member, bracket, frame, etc.), seat frames, center consoles, fenders, sheet metal framework, or the like.

FIG. 1a illustrates a clip-based fastening system 100a configured to couple the first panel 102 to the second panel 104. As illustrated, the first panel 102 may include one or more towers 108 that protrude from the B-surface 102b. Each tower 108 (sometimes called a bezel or protrusion) may be shaped as a blade or planar tab, for example. To form the blind connection between the first panel 102 and the second panel 104, the fastener 112 and the tower 108 are inserted into an opening 110 formed in or on a surface of the second panel 104. In some examples, the fastener 112 may be pre-attached to either the tower 108 or the opening 110 to define a part-in-assembly (PIA). The tower 108 of the first panel 102 is inserted into a channel formed by the fastener 112 to, in effect, lock the fastener 112 in place within the opening 110, thus securing the first panel 102 and the second panel 104 to one another. The clip-based fastening system 100a eliminates rib setup variation and allows for a relatively close assembled distance ($D_1$) between the first and second panels 102, 104. A clip-based fastening system 100a provides a blind PIA solution that positions the second panel 104 closely to the first panel 102 since the tower 108 can pass through the opening 110 in the second panel 104 to the B-side. Both the length of the fastener 112 and the length of the tower 108 determine the protrusion distance ($P_1$) on the B-side.

FIG. 1b illustrates a doghouse-based fastening system 100b configured to couple the first panel 102 to the second panel 104. As illustrated, the first panel 102 may include one or more doghouse structures 106 that protrude from the B-surface 102b. A doghouse structure 106 allows for the first panel 102 to be used with a wide variety of fasteners 112, such as W-type fasteners, push pin fasteners, etc. For example, a variety of different fasteners 112 may be designed with a common head assembly that is sized and shaped to engage the doghouse structure 106, thus enabling interchangeability of the fasteners 112.

A fastener 112 is coupled to the doghouse structure 106 and configured to pass at least partially through the opening 110 and engage the second panel 104. As illustrated, the doghouse structures 106 increases the assembled distance ($D_2$) between the first and second panels 102, 104. Thus, a doghouse-based fastening system 100b can introduce a barrier to achieving close-panel, blind PIA fastening because the doghouse structure 106 occupies space between the first and second panels 102, 104. As illustrated, the protrusion distance ($P_2$) through the B-side of the second panel 104 is dictated by the on the length of the fastener 112. Therefore, a shorter fastener 112 may be employed to reduce the protrusion distance ($P_2$).

FIG. 1c illustrates a second doghouse-based fastening system 100c configured to couple the first panel 102 to the second panel 104. As explained in connection with FIG. 1b, the doghouse structure 106 can result in a larger assembled distance ($D_3$). To reduce the assembled distance, the second panel 104 may be shaped with a recessed panel 114 to accommodate the doghouse structure 106. By using a recessed panel 114 with a doghouse structure 106, the first and second panels 102, 104 can be positioned much closer together to achieve a smaller assembled distance ($D_3$). The recessed panel 114, however, must be large enough to house the doghouse structure 106. In some cases, a large recessed panel 114 may negatively impact the overall assembly performance and/or appearance of the second panel 104. Further, the recessed panel 114 increases the protrusion distance ($P_3$) through the B-side of the second panel 104, thus decreasing useable space on the B-side of the second panel 104.

FIG. 1d illustrates a pass-through doghouse-based fastening system 100d configured to couple the first panel 102 to the second panel 104, while minimizing both the assembled distance ($D_4$) between the first and second panels 102, 104 and the protrusion distance ($P_4$) through the B-side of the second panel 104. The pass-through doghouse-based fastening system 100d uses a smaller doghouse structure 106 that is configured pass at least partially through the opening 110 in the second panel 104, thus achieving a small assembled distance ($D_4$) that is comparable to the assembled distance ($D_3$) of FIG. 1c, but without necessitating the recessed panel 114.

Figure 2B:
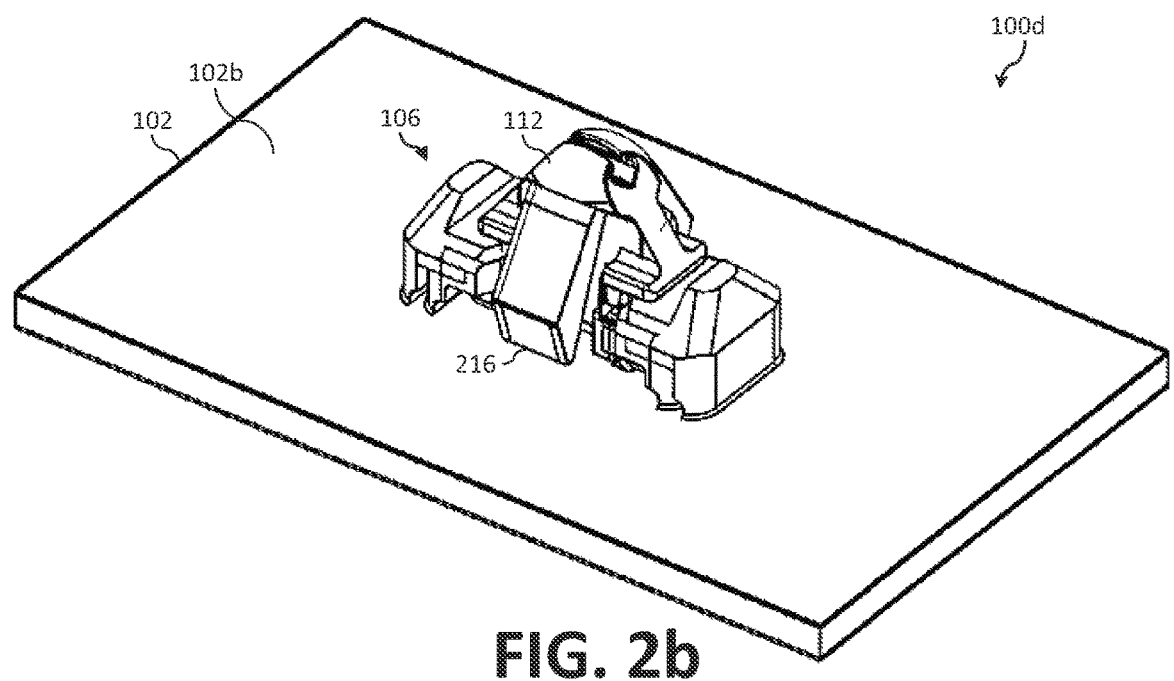
Figure 2C:
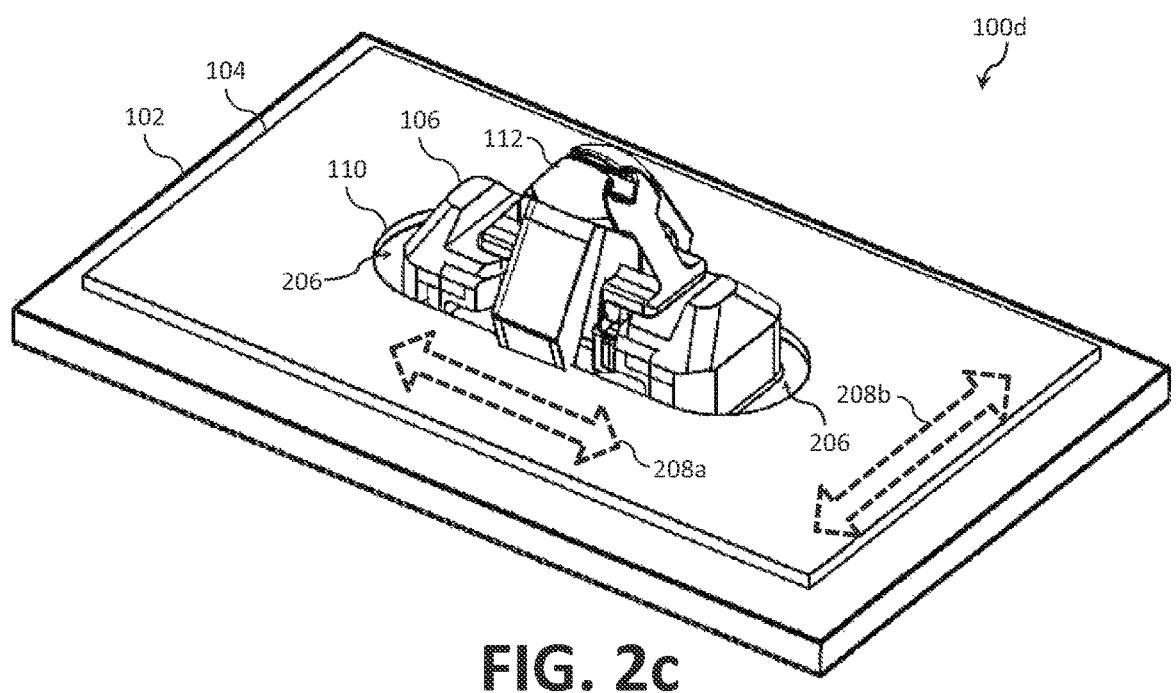

FIGS. 2a through 2c illustrate an example pass-through doghouse-based fastening system 100d. Specifically, FIG. 2a illustrates a perspective assembly view of the example pass-through doghouse-based fastening system 100d of FIG. 1d, while FIGS. 2b and 2c illustrate, respectively, partially assembled and assembled perspective views thereof.

While a blind connection will be described primarily, it is to be understood, however, that the present fastening system may be adapted for use with structures other than the illustrated first and second panel 102, 104 that do not require the blind connection described. Accordingly, the present fastening system is not to be limited to only blind connections. Further, while only a single doghouse structure 106 and a single opening 110 are illustrated in the examples, it should be appreciated that a given first panel 102 may include multiple doghouse structures 106 and the second panel 104 may include multiple openings 110, depending on the number of fastener points to be used between the first and second panels 102, 104. In used, the head assembly 210 slides into the doghouse structure 106 as indicated by the first arrow 202 to form a PIA. Once in place, the fastener 112 may be inserted into the opening 110 of the second panel 104 as indicated by the second arrow 204.

The fastener 112 generally comprises a head assembly 210, a neck 212, a collar 214, and one or more retention features 216. The head assembly 210 is configured to engage a doghouse structure 106 of the first panel 102. The neck 212, which couples the head assembly 210 to the collar 214, is typically narrower than the head assembly 210 and the collar 214. The collar 214 is configured to enter and engage (or otherwise retain) the second panel 104 via, for example, the opening 110. As can be appreciated, a portion of the neck 212 may also pass through the opening 110. The collar 214 may be secured within the opening 110 via one or more retention features 216, which may be outwardly biased legs coupled to the collar 214. In some examples, the collar 214 may be omitted, in which case the retention features 216 may be coupled directly to the neck 212. The retention features 216 may include a return arm 216a resiliently connected to the collar 214 that deflects as an end of the fastener 112 is inserted into an opening 110 of the second panel 104. A catch 216b (e.g., a ledge, lip, etc.) may be coupled to a distal end of the return arm 216a to engage the second panel 104 (e.g., at the perimeter of the opening 110). The retention features 216 are relatively rigid towards outward forces and as such will lock the collar 214 (or neck 212) into place within the second panel 104 once it has passed through the opening 110. Additionally, the fastener 112 may be configured to engage one or more features of the second panel 104.

The fastener 112 may be fabricated in various sizes depending on the application. The illustrated fastener 112 can be described as a "W-type" fastener because it generally resembles a "W" when viewed from a side, as best illustrated in FIGS. 1b through 1d. A W-type fastener provides lead-in features for finding the opening 110. While the fastener 112 is generally described and illustrated as a W-type fastener, as will be discussed in connection with FIGS. 3a through 3d, the fastener 112 may adopt other types of fasteners for use with the pass-through doghouse-based fastening system 100d.

The opening 110 can be generally rectangular and define a size and shape that is complementary to that of the fastener 112 such that the fastener 112 can be inserted and retained therein. However, openings 110 of other shapes are contemplated. Therefore, the opening 110 may be rectangular, rounded rectangular (e.g., a stadium), circular (FIGS. 6a to 6d), oval, or any other suitable shape.

As illustrated, the second panel 104 is sized and shaped to define the at the doghouse structure 106. The doghouse structure 106 acts as a receptacle for a head assembly 210 of the fastener 112. It is desirable to insert the head assembly 210 of the fasteners 112 into the chamber 218 and retain it therein. As illustrated, the doghouse structure 106 is composed of a set of doghouse sidewalls 220 defining a chamber 218 therebetween. The doghouse sidewalls 220 may include one or more features shaped to increase engagement with the head assembly 210, such as interference features 222. In some examples, the interference features 222 may exhibit a soft click as the fastener 112 is secured in the chamber 218. The doghouse structure 106 provides a clear pathway from one or more insertion openings to the chamber 218. In the illustrated example, the fastener 112 would be able to slide into the chamber 218 of the doghouse structure 106 from one of two insertion openings. For example, the fastener 112 would be able to slide as illustrated by arrow 202 or in the opposite direction. It is contemplated that the doghouse structure 106 may be molded during molding of the first panel 102; however, in some examples, they may be fabricated separated and joined to one another (e.g., using adhesive, mechanical fasteners, etc.).

The doghouse structure 106 is contemplated to be modified in size and shape to suit individual applications. For example, while illustrated with two opposing doghouse sidewalls 220, in some examples, the doghouse structure 106 may further include a doghouse endwall formed to bridge the gap between the set of doghouse sidewalls 220, thereby walling off three of the four sides of the chamber 218. In this example, the fastener 112 would only be able to slide into the chamber 218 of the doghouse structure 106 from a single insertion opening, but would be restricted in movement at three sides.

As will become apparent, it is sometimes useful to assemble the first panel 102 and the second panel 104 by first inserting the fastener 112 into the doghouse structure 106 of the first panel 102 (as indicated by the first arrow 202) to form a PIA and then subsequently inserting fastener 112 of the PIA into an opening 110 of the second panel 104 (as indicated by the second arrow 204). In some examples, to assemble a pass-through doghouse-based fastening system 100d, the head assembly 210 of the fastener 112 is slid laterally across a surface of the first panel 102 into the chamber 218 until fastener 112 stops (e.g., against a wall) or is otherwise aligned between the doghouse sidewalls 220. In some examples, the fastener 112 is held in place by interference features 222, which may exhibit a soft click as the fastener 112 is secured in the chamber 218. The fastener 112, now a PIA component with the first panel 102 (FIG. 2b), may be shipped to a customer (e.g., an original equipment manufacturer (OEM)). The OEM may then assemble the PIA component with a second panel (e.g., a vehicle panel) via all the fasteners 112 coupled thereto as illustrated in FIG. 2c.

The doghouse structure 106 can make the head assembly 210 of the fastener 112 positionally located in a fixed manner or, if desired, to provide the fastener 112 with some linear freedom (e.g., float) to move within the chamber 218. While a smaller doghouse can limit the positional float of the head assembly 210 within the chamber 218, positional freedom requirements can be accomplished via the opening 110. Therefore, the pass-through doghouse-based fastening system 100d enables the doghouse structure 106 to directly interact with the opening 110 to allow fasteners 112, such as W-type fasteners, to be part of a datum or locating solution.

The opening 110 may be sized to provide a desired amount of longitudinal movement 208a and/or lateral movement 208b. In some examples, the pass-through doghouse-based fastening system 100d may be configured to accommodate 2-way assembly tolerance or float (e.g., for thermal growth) in the longitudinal direction (length) of the opening 110. The tolerance in the longitudinal direction may be, for example, about ±1 mm to ±5 mm, or about ±3 mm. In other examples, a 4-way version of the pass-through doghouse-based fastening system 100d is contemplated with tolerance in the lateral direction (width) as well as the longitudinal direction. The tolerance in the longitudinal direction may be, for example, about 1 mm to ±3 mm, or about ±1 mm. In some examples, the lateral direction tolerance is less than the longitudinal direction tolerance, yielding an asymmetrical tolerance or float solution (e.g., the longitudinal direction tolerance may be ±3 mm, while the lateral direction tolerance may be ±1 mm). For example, as best illustrated in FIG. 2c, the opening 110 may be lengthened along its longitudinal axis to define movement gaps 206 that allow for longitudinal movement 208a. The amount of lateral direction tolerance is dictated by the type of fastener 112 used. For example, the width of the opening 110 cannot be wider than the width of the retention features 216 when the expanded since the catch 216b would need to engage a portion of the opening 110. In some examples, the opening 110 may be sized to provide minimal longitudinal movement 208a and/or lateral movement 208b, for example, with an assembly clearance of about ±0.25 mm.

Those of skill in the art would appreciate that the principles of the pass-through doghouse-based fastening system 100d may be used with various types of fasteners 112, provided that the head assembly 210 is configured to engage the doghouse structure 106.

Figure 3A:
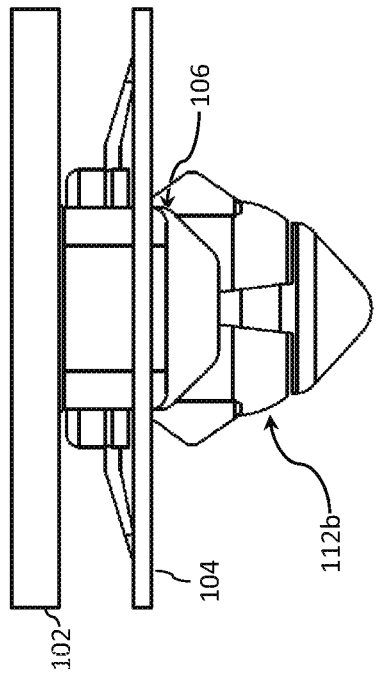
FIGS. 3a through 3d illustrate, respectively, a push pin fastener, a pin and grommet (P&G) fastener, a box-prong fastener, and a specialty fastener for use with a pass-through doghouse-based fastening system.
Figure 3B:
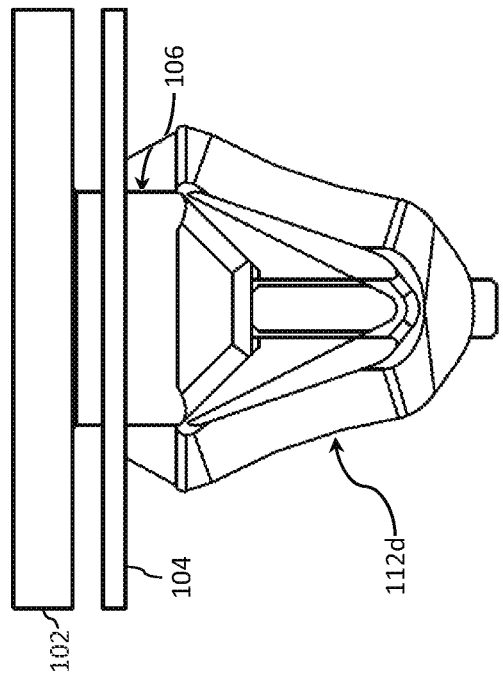
Figure 3C:
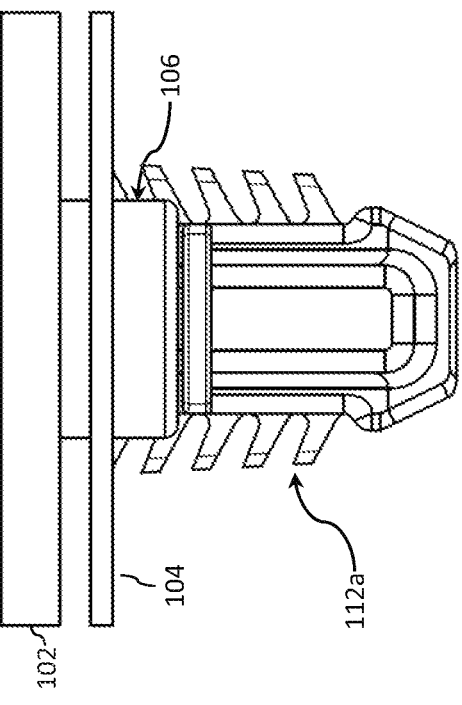
Figure 3D:
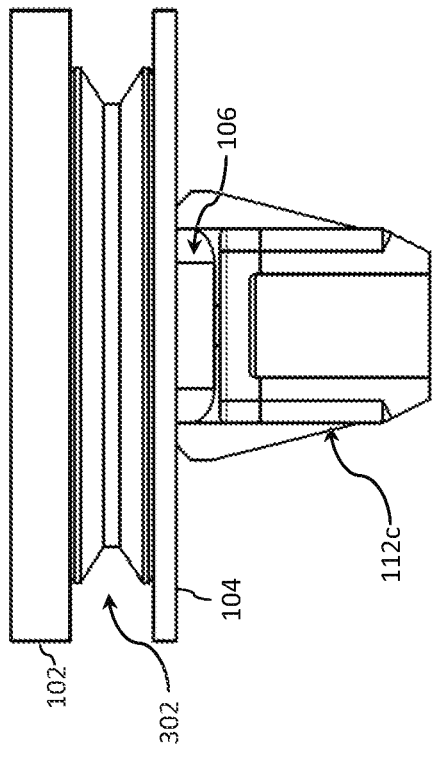
Figure 6A:
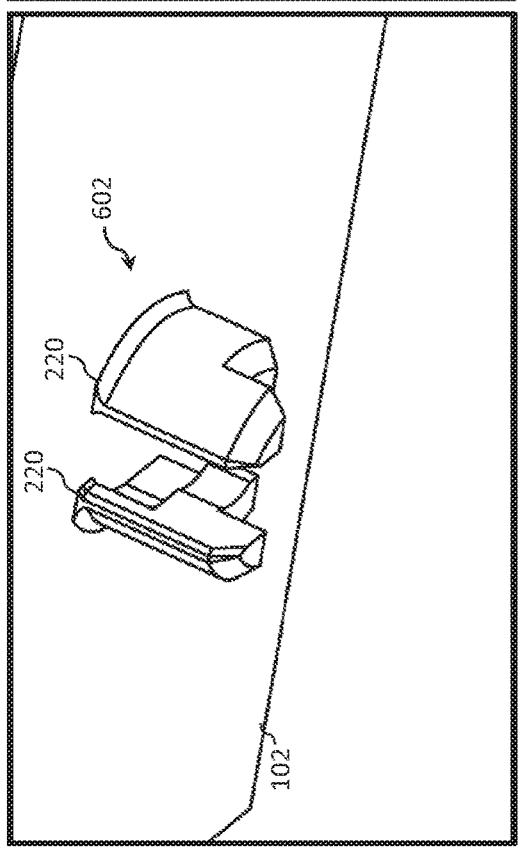
FIGS. 6a through 6d illustrate an example pass-through doghouse-based fastening system configured in accordance with another aspect of this disclosure.
Figure 6B:
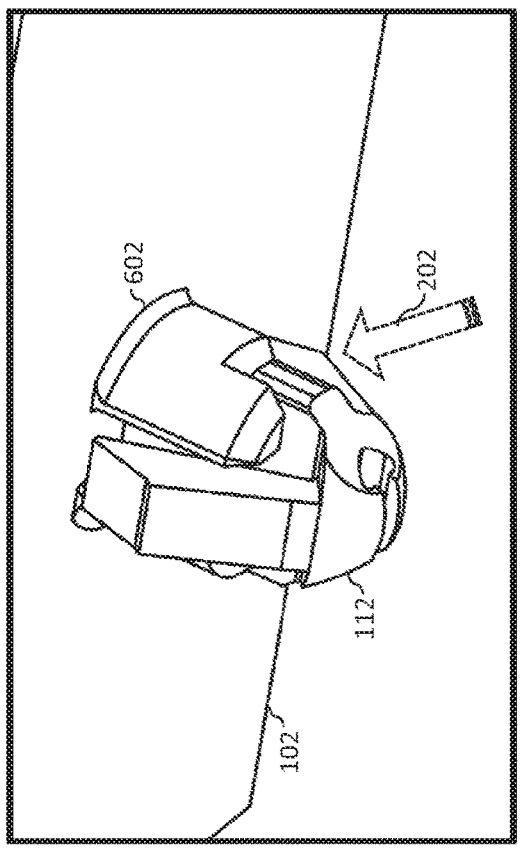
Figure 6C:
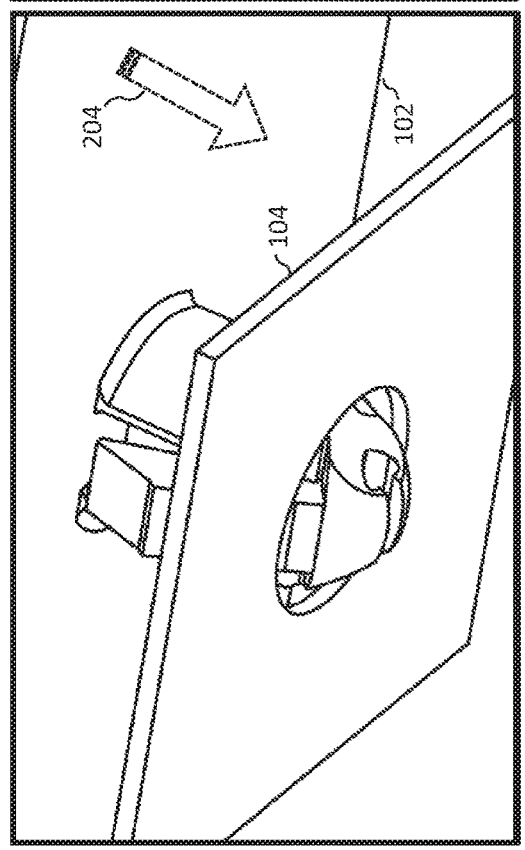
Figure 6D:
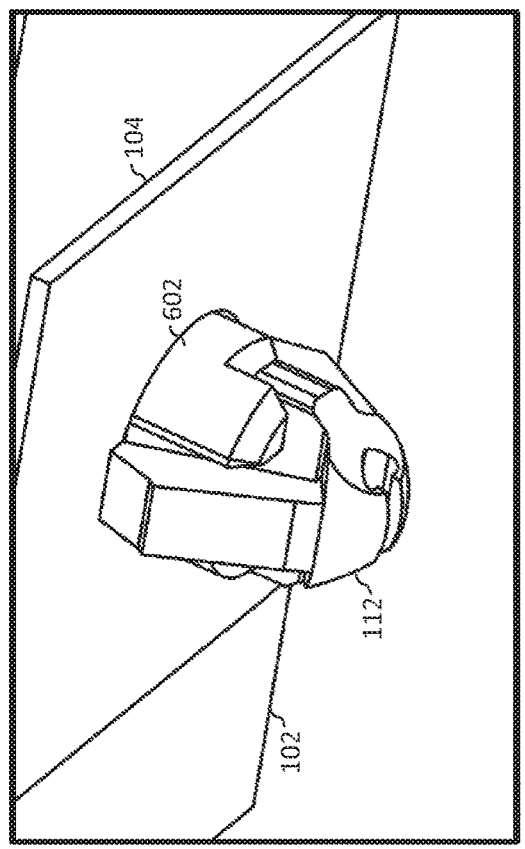

An end of the fastener 112 (e.g., the neck 212 and/or the collar 214) may be shaped as any desired type of fastener 112. FIGS. 3a through 3d illustrate, respectively, a push pin fastener 112a, a pin and grommet (P&G) fastener 112b, a box-prong fastener 112c, and a specialty fastener 112d (e.g., a CenterLok™ fastener, which is available from Deltar). As illustrated in FIG. 3a, the push pin fastener 112a (sometimes called trees, pine trees, Christmas trees, etc.) includes a plurality of barbs or teeth along its length. With reference to FIG. 3b, the P&G fastener 112b is a reusable two-piece fastener having a low insertion value. The P&G fastener 112b may be a single position fastener or a multi-position fastener. Each of the aforementioned fasteners can include a head assembly 210 is configured to engage the doghouse structure 106 and used in lieu of a W-type fastener to fasten components and panels very closely to one other, while still using a doghouse structure 106. In some examples, as illustrated in FIG. 3c, the pass-through doghouse-based fastening system 100d may comprises a seal 302 positioned between the first and second panels 102, 104. For example, a seal 302 may be used where it is desirable to mitigate dust, dirt, and/or moisture penetration through the opening 110. The seal 302 may be embodied as a ring (e.g., an annulus) and fabricate from foam material, thermoplastic, rubber, etc. For example, as illustrated, a seal 302 can be configured to surround the doghouse structure 106 between the first panel 102 and the second panel 104. In some examples, the pass-through doghouse-based fastening system 100d may include additional features, such as ribs and wings.

FIGS. 4a and 4b illustrate example pass-through doghouse-based fastening system 100d configured with ribs 402. When assembled, the ribs 402 reside between the first and second panels 102, 104 at an interface between the doghouse structure 106 and the first panel 102. The ribs 402 serve as a buttress to increase the strength and support of the doghouse structure 106 (e.g., the doghouse sidewalls 220), while also controlling over-travel, where desired or required. Therefore, in some examples, the fastener 112 comprises one or more ribs 402 configured to support the doghouse structure 106 and to control over-travel.

FIGS. 5a and 5b illustrate example pass-through doghouse-based fastening system 100d configured with ribs 402 and wings 502. The wings 502, which may be flexible, help control over-travel and mitigate BSR. When assembled, the ribs 402 and wings 502 reside between the first and second panels 102, 104. As illustrated, the wings 502 are coupled to the head assembly 210 (e.g., near the retention features 216) and biased to push against the second panel 104 once assembled, effectively serving as a spring between the first and second panels 102, 104 to absorb movement between the first panel and the second panel.

While the doghouse structure 106 is illustrated as generally rectangular, other shapes are contemplated, including other quadrilaterals (e.g., square) and rounded shapes (e.g., circles and ovals). For examples, FIGS. 6a through 6d illustrate an example pass-through doghouse-based fastening system with a generally circular doghouse structure 602 and a fastener 112 (again illustrated as a W-type fastener). As with the pass-through doghouse-based fastening systems of FIGS. 2a through 2c, the doghouse structure 602 comprises a set of doghouse sidewalls 220; however, the doghouse sidewalls 220 are shaped to define a generally circular outer perimeter.

FIG. 7 is a flowchart representative of an example method 700 of coupling a first panel 102 to a second panel 104 using a pass-through doghouse-based fastening system having a doghouse structure 106 and a fastener 112. The fastener 112 has a head assembly 210 and a neck 212. At step 702, the head assembly 210 slides across a surface of the first panel 102 into a chamber 218 of the doghouse structure 106. At step 704, at least a portion of the neck 212 and/or the collar 214 passes through an opening 110 formed on the second panel 104. The neck 212 and/or the collar 214 is configured to engage the second panel 104 via a retention feature 216. In some examples, the retention feature 216 includes a return arm 216a resiliently connected to a collar 214 that is coupled to a collar 214 and configured to deflect as the collar 214 is passed through the opening 110. As mentioned above, in some examples the retention features 216 are coupled to the neck 212 and a collar 214 is omitted. At step 706, passing at least a portion of the doghouse structure 106 through the opening 110.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

The invention claimed is:

1. A fastener for forming a blind connection between a first panel and a second panel, the fastener comprising:
a head assembly; and
a retention feature extending outwardly from the fastener at an end opposite the head assembly;
wherein the fastener is configured to attach the first panel adjacent to the second panel, the first panel having a doghouse structure and the second panel having an opening formed therethrough,
wherein, when assembled, the opening is positioned about the doghouse structure with the head assembly positioned within the doghouse structure to from the blind connection, and
wherein the doghouse structure and head assembly are configured to pass at least partially through the opening.

2. The fastener of claim 1, wherein the doghouse structure defines a chamber that is configured to receive and secure the head assembly.

3. The fastener of claim 1, wherein the fastener is a W-type fastener.

4. The fastener of claim 1, wherein the fastener is a push pin fastener or a pin and grommet (P&G) fastener.

5. The fastener of claim 1, wherein the fastener comprises one or more ribs configured to support the doghouse structure and to control over-travel.

6. The fastener of claim 5, wherein the one or more ribs are positioned at an interface between the doghouse structure and the first panel.

7. The fastener of claim 1, wherein the fastener comprises a wing coupled to the head assembly and shaped as a spring to absorb movement between the first panel and the second panel.

8. The fastener of claim 1, further comprising a seal configured to surround the doghouse structure between the first panel and the second panel.

9. The fastener of claim 1, wherein the retention feature is configured to engage the second panel via a catch.

10. The fastener of claim 9, wherein the retention feature includes a return arm resiliently connected to the end opposite the head assembly via a collar and configured to deflect as the collar is passed through the opening.

11. The fastener of claim 9, wherein the catch is configured to engage the second panel at a location adjacent to the doghouse structure.

12. A fastening system comprising:
a first panel having a first surface and a second surface;
a doghouse structure formed on the second surface, wherein the doghouse structure defines a chamber;
a second panel defining an opening; and
a fastener having a head assembly and a retention feature extending outwardly from the fastener at an end opposite the head assembly,
wherein the chamber is configured to receive the head assembly and the retention feature is configured to pass through and to retain the second panel via the opening, and
wherein the doghouse structure and head assembly are configured to pass at least partially through the opening.

13. The fastening system of claim 12, wherein the first surface is an A-surface and the second surface is a B-surface.

14. The fastening system of claim 12, wherein the fastener comprises a retention feature configured to engage the second panel via a catch.

15. The fastening system of claim 12, wherein the fastener is a W-type fastener.

16. The fastening system of claim 12, wherein the fastener comprises a wing shaped as a spring to absorb movement between the first panel and the second panel.

17. A fastening system comprising:
a first panel having a first surface and a second surface;
a doghouse structure formed on the second surface, wherein the doghouse structure defines a chamber;
a second panel defining an opening that corresponds to an outer perimeter of the doghouse structure; and a fastener having a head assembly and a retention feature extending outwardly from the fastener at an end opposite the head assembly, wherein the chamber is configured to receive the head assembly and the retention feature is configured to pass through and to retain the second panel via the opening, and wherein the doghouse structure is configured to pass at least partially through the opening.

18. The fastening system of claim 17, wherein the opening sized to provide a desired amount of longitudinal movement or lateral movement.

19. The fastening system of claim 17, wherein the opening sized to provide a minimal amount of longitudinal movement or lateral movement.

20. The fastening system of claim 17, wherein the minimal amount is ±0.25 mm.

\* \* \* \* \*